US009546284B1

(12) United States Patent
Costello et al.

(10) Patent No.: US 9,546,284 B1
(45) Date of Patent: Jan. 17, 2017

(54) DUST PREVENTION COMPOSITIONS, COATINGS AND PROCESSES OF MAKING

(71) Applicant: Palm Coast Imports, LLC, Memphis, TN (US)

(72) Inventors: Samuel V. Costello, Madison Heights, MI (US); Brendan Byrne, Germantown, TN (US)

(73) Assignee: HKC-US, LLC, Memphis, TN (US)

( * ) Notice: Subject to any disclaimer, the term of this patent is extended or adjusted under 35 U.S.C. 154(b) by 113 days.

(21) Appl. No.: 14/530,154

(22) Filed: Oct. 31, 2014

Related U.S. Application Data

(60) Provisional application No. 62/022,932, filed on Jul. 10, 2014.

(51) Int. Cl.
*C09D 5/24* (2006.01)
*B05D 1/28* (2006.01)

(52) U.S. Cl.
CPC . *C09D 5/24* (2013.01); *B05D 1/28* (2013.01); *B05D 2401/10* (2013.01)

(58) Field of Classification Search
CPC ..................................................... C09D 5/24
See application file for complete search history.

(56) References Cited

U.S. PATENT DOCUMENTS

| 6,800,354 | B2 | 10/2004 | Baumann |
| 6,811,856 | B2 | 11/2004 | Nun |
| 6,881,687 | B1 | 4/2005 | Castrucci |
| 7,037,591 | B2 | 5/2006 | Henze |
| 7,517,487 | B2 | 4/2009 | Nun |
| 7,534,485 | B2 | 5/2009 | Yamaguchi |
| 7,713,955 | B2 | 5/2010 | Whiteford |
| 8,147,607 | B2 | 4/2012 | Baumgart |
| 8,258,206 | B2 | 9/2012 | Kanagasabapathy |
| 8,338,351 | B2 | 12/2012 | Kanagasabapathy |
| 2002/0142150 | A1 | 10/2002 | Baumann |
| 2002/0150723 | A1 | 10/2002 | Oles |
| 2003/0186065 | A1* | 10/2003 | Hou ..................... C03C 17/32 428/441 |
| 2004/0105985 | A1 | 6/2004 | Henze |
| 2004/0209072 | A1 | 10/2004 | Henze |
| 2005/0084653 | A1 | 4/2005 | Nun |
| 2005/0118433 | A1 | 6/2005 | Oles |
| 2005/0205830 | A1 | 9/2005 | Oles |
| 2005/0253302 | A1 | 11/2005 | Nun |
| 2006/0246277 | A1 | 11/2006 | Axtell |
| 2007/0184981 | A1 | 8/2007 | Nun |
| 2008/0207581 | A1 | 8/2008 | Whiteford |
| 2008/0221009 | A1 | 9/2008 | Kanagasabapathy |
| 2009/0018249 | A1 | 1/2009 | Kanagasabapathy |
| 2009/0025508 | A1 | 1/2009 | Liao |
| 2009/0064894 | A1 | 3/2009 | Baumgart |
| 2009/0123659 | A1 | 5/2009 | Oles |
| 2011/0076478 | A1 | 3/2011 | Haynes |

FOREIGN PATENT DOCUMENTS

| CA | 2368204 | 9/2008 |
| DE | 19921885 | 11/2000 |
| DE | 10230065 | 1/2004 |
| DE | 10233831 | 2/2004 |
| JP | 11207871 | 8/1999 |
| JP | 2005256192 | 9/2005 |
| WO | 2008107113 | 9/2008 |
| WO | 2009059740 | 5/2009 |
| WO | 2009074124 | 6/2009 |

OTHER PUBLICATIONS

Taylor, K., A Modification of the Phenol/Sulfuric Acid Assay for Total Carbohydrates Giving More Comparable Absorbances, Applied Biochemistry and Biotechnology, 1995, pp. 207-214, vol. 53, issue 3, abstract.
Sahan, E., et al, Carbon in Atmospheric Particulate Matter, Energy Research Center of the Netherlands, 2008, pp. 1-22.
Stein, S., et al., Measurements of Relative Humidity-Dependent Bounce and Density for Atmospheric Particles Using the DMA-Impactor Technique, Atmospheric Environment, 1994, pp. 1739-1746, vol. 28, issue 10, abstract.
Henningson, E., et al., A Comparative Study of Different Methods to Determine the Total Number and the Survival Ratio of Bacteria in Aerobiological Samples, Journal of Aerosol Science, 1997, pp. 459-469, vol. 28, issue 3, abstract.
Hernandez, M., et al., A Combined Fluorochrome Method for Quantitation of Metabolically Active and Inactive Airborne Bacteria, Aerosol Science and Technology, 1999, pp. 145-160, vol. 30.

* cited by examiner

*Primary Examiner* — Robert Harlan
(74) *Attorney, Agent, or Firm* — Brian S. Steinberger; Law Offices of Brian S. Steinberger, P.A.

(57) ABSTRACT

Compositions, applications, coatings, processes of making and applying compositions and compositions for preventing dust buildup on plastic and wood surfaces such as on ceiling fan blades, portable fan blades, stand fan blades, window blinds, appliances, furniture, cabinet knobs, and drawer pulls. The compositions and coating prevent dust buildup by (1) dissipating static charges on the blades and (2) creating a very smooth blade surface that prevents dust particles getting "captured". The coating can have a clear matte finish and contains an anti-static and high lubricity additive to deter the accumulation of dust. After applying the coating the dry time of the coatings by thin coat gravure rollers is approximately four minutes. When applied the coating can result in up to approximately 50% less dust buildup over a one week period of time.

9 Claims, 4 Drawing Sheets

FIG. 1

Table 1: Compositional Summary of the final formulation

| ID | Function | Broad Range | | | Narrow Range | | | Preferred 51.9% Ethanol | |
|---|---|---|---|---|---|---|---|---|---|
| | | Total Formula % (w/w) | Total Formula % (w/w) | KG per liter of final product | KG per liter of final product | Total Formula % (w/w) | Total Formula % (w/w) | KG per liter of final product | KG per liter of final product |
| | | | | | | | Narrow | | Preferred |
| | | Total Formula % (w/w) | Total Formula % (w/w) | KG per liter of final product | KG per liter of final product | Total Formula % (w/w) | Total Formula % (w/w) | KG per liter of final product | KG per liter of final product |
| Alcohol Soluble Polyamide Resin | Thermoset/Adhesion | 5.00% | 2.08% | 0.043 KG | 0.018 KG | 4.17% | 3.12% | 0.036 KG | 0.027 KG |
| Fumed Aluminum Oxide | Anti-Static/Matting Agent | 4.00% | 1.67% | 0.0344 KG | 0.014 KG | 3.34% | 2.50% | 0.0287 KG | 0.022 KG |
| PDMS | Lubricity Agent | 3.00% | 1.25% | 0.0258 KG | 0.011 KG | 2.50% | 1.87% | 0.0215 KG | 0.016 KG |
| Alkylolammonium salt of an unsaturated acidic carboxylic acid ester | Conductivity | 2.00% | 0.83% | 0.0172 KG | 0.007 KG | 1.67% | 1.25% | 0.0144 KG | 0.0108 KG |
| Hydrophobic copolymer polyelectrolyte | Dispersant | 0.50% | 0.22% | 0.0043 KG | 0.0019 KG | 0.42% | 0.31% | 0.0031 KG | 0.0026 KG |
| 2,5-thiophenediylbis(5-tert-butyl-1,3-benzoxazole) | UV Activator | 0.05% | 0.02% | 0.00043 KG | 0.0002 KG | 0.04% | 0.03% | 0.00034 KG | 0.00026 KG |
| 95% Ethanol; 5% Isopropyl Alcohol | Solvent | 51.90% | 80% | 0.446 KG | 0.687 KG | 60% | 70% | 0.516 KG | 0.602 KG |
| Polyamide Resin | Binder | 33.55% | 13.93% | 0.2885 KG | 0.120 KG | 27.86% | 20.92% | 0.240 KG | 0.180 KG |
| | | 100.00% | 100.00% | | | 100.00% | 100.00% | | |

Preferred 51.9% Ethanol column:
- Alcohol Soluble Polyamide Resin: 5.00% / 0.043 KG
- Fumed Aluminum Oxide: 4.00% / 0.0344 KG
- PDMS: 3.00% / 0.0258 KG
- Alkylolammonium salt: 2.00% / 0.0172 KG
- Hydrophobic copolymer polyelectrolyte: 0.50% / 0.0043 KG
- 2,5-thiophenediylbis(5-tert-butyl-1,3-benzoxazole): 0.05% / 0.00043 KG
- 95% Ethanol; 5% Isopropyl Alcohol: 51.90% / 0.446 KG
- Polyamide Resin: 33.55% / 0.2885 KG
- Total: 100.00%

51.9% Ethanol Formula - All weights below are per liter of final product needed.

1) Premix .2885 KG of Polyamide Resin with .3995 KG of Denatured Ethanol. Avomeen suggests premixing this formulation as it take time to blend.
2) Slowly add .0344 KG of Fumed Aluminum Oxide to the blended formula above while mixing at medium speed - do not breathe the dust.
3) Add .00043 KG of 2,5-thiophenediylbis(5-tert-butyl-1,3-benzoxazole), .0258 KG of PDMS and .0172 KG Alkylolammonium salt of an unsaturated acidic carboxylic acid ester to formula continuing to mix at medium speed.
4) Add .043 KG Alcohol Soluble Polyamide Resin and mix on high speed.
5) While continuing to mix at high speed, add remaining .0465 KG Denatured Ethanol.
6) Add .0043 KG Hydrophobic copolymer polyelectrolyte and blend at high speed for 30 minutes.
7) Slight settling can occur over time. Product should be agitated before being added to roller machine for applicaton.

FIG. 2

Table 2: Compositional Summary of the final formulation

| ID | Function | Broad Range | | | Narrow Range | | | | | Preferred 60% Ethanol | |
|---|---|---|---|---|---|---|---|---|---|---|---|
| | | Total Formula % (w/w) | KG per liter of final product | | Total Formula % (w/w) | KG per liter of final product | | Total Formula % (w/w) | KG per liter of final product | Total Formula % (w/w) | KG per liter of final product |
| Alcohol Soluble Polyamide Resin | Thermoset/Adhesion | 5.00% | 0.043 KG | 0.018 KG | 4.17% | 0.036 KG | 0.027 KG | 3.12% | 0.036 KG | 4.17% | 0.036 KG |
| Fumed Aluminum Oxide | Anti-Static/Matting Agent | 4.00% | 0.0344 KG | 0.014 KG | 3.34% | 0.0287 KG | 0.022 KG | 2.50% | 0.0287 KG | 3.34% | 0.0287 KG |
| PDMS | Lubricity Agent | 3.00% | 0.0258 KG | 0.011 KG | 2.50% | 0.0215 KG | 0.016 KG | 1.87% | 0.0215 KG | 2.50% | 0.0215 KG |
| Alkylolammonium salt of an unsaturated acidic carboxylic acid ester | Conductivity | 2.00% | 0.0172 KG | 0.007 KG | 1.67% | 0.0144 KG | 0.0108 KG | 1.25% | 0.0144 KG | 1.67% | 0.0144 KG |
| Hydrophobic copolymer polyelectrolyte | Dispersant | 0.50% | 0.0043 KG | 0.0019 KG | 0.42% | 0.0031 KG | 0.0026 KG | 0.31% | 0.0031 KG | 0.42% | 0.0031 KG |
| 2,5-thiophenediylbis(5-tert-butyl-1,3-benzoxazole) | UV Activator | 0.05% | 0.00043 KG | 0.0002 KG | 0.04% | 0.00034 KG | 0.00026 KG | 0.03% | 0.00034 KG | 0.04% | 0.00034 KG |
| 95% Ethanol; 5% Isopropyl Alcohol | Solvent | 51.90% | 0.446 KG | 0.687 KG | 60% | 0.516 KG | 0.602 KG | 70% | 0.516 KG | 60% | 0.516 KG |
| Polyamide Resin | Binder | 33.55% | 0.2885 KG | 0.120 KG | 27.86% | 0.240 KG | 0.180 KG | 20.92% | 0.240 KG | 27.86% | 0.240 KG |
| | | 100.00% | 100.00% | | 100.00% | | | 100.00% | | 100.00% | |

60% Ethanol Formula - All weights below are per liter of final product needed.
1) Premix .240 KG of Polyamide Resin with .332 KG of Denatured Ethanol. Avomeen suggests premixing this formulation as it take time to blend.
2) Slowly add .0287 KG of Fumed Aluminum Oxide to the blended formula above while mixing at medium speed - do not breathe the dust.
3) Add .00034 KG of 2,5-thiophenediylbis(5-tert-butyl-1,3-benzoxazole), .0215 KG of PDMS and .0144 KG Alkylolammonium salt of an unsaturated acidic carboxylic acid ester to formula continuing to mix at medium speed.
4) Add .036 KG Alcohol Soluble Polyamide Resin and mix on high speed.
5) While continuing to mix at high speed, add remaining .196 KG Denatured Ethanol.
6) Add .0031 KG Hydrophobic copolymer polyelectrolyte and blend at high speed for 30 minutes.
7) Slight settling can occur over time. Product should be agitated before being added to roller machine for applicaton.

FIG. 3

Table 3: Compositional Summary of the final formulation

| ID | Function | Broad Range | | | Narrow Range | | | Preferred 70% Ethanol | |
|---|---|---|---|---|---|---|---|---|---|
| | | Total Formula % (w/w) | KG per liter of final product | KG per liter of final product | Total Formula % (w/w) | KG per liter of final product | KG per liter of final product | Total Formula % (w/w) | KG per liter of final product |
| Alcohol Soluble Polyamide Resin | Thermoset/Adhesion | 5.00% | 0.043 KG | 0.018 KG | 4.17% | 0.036 KG | 0.027 KG | 3.12% | 0.027 KG |
| Fumed Aluminum Oxide | Anti-Static/Matting Agent | 4.00% | 0.0344 KG | 0.014 KG | 3.34% | 0.0287 KG | 0.022 KG | 2.50% | 0.022 KG |
| PDMS | Lubricity Agent | 3.00% | 0.0258 KG | 0.011 KG | 2.50% | 0.0215 KG | 0.016 KG | 1.87% | 0.016 KG |
| Alkylolammonium salt of an unsaturated acidic carboxylic acid ester | Conductivity | 2.00% | 0.0172 KG | 0.007 KG | 1.67% | 0.0144 KG | 0.0108 KG | 1.25% | 0.0108 KG |
| Hydrophobic copolymer polyelectrolyte | Dispersant | 0.50% | 0.0043 KG | 0.0019 KG | 0.42% | 0.0031 KG | 0.0026 KG | 0.31% | 0.0026 KG |
| 2,5-thiophenediylbis(5-tert-butyl-1,3-benzoxazole) | UV Activator | 0.05% | 0.00043 KG | 0.0002 KG | 0.04% | 0.00034 KG | 0.00026 KG | 0.03% | 0.00026 KG |
| 95% Ethanol; 5% Isopropyl Alcohol | Solvent | 51.90% | 0.446 KG | 0.687 KG | 60% | 0.516 KG | 0.602 KG | 70% | 0.602 KG |
| Polyamide Resin | Binder | 33.55% | 0.2885 KG | 0.120 KG | 27.86% | 0.240 KG | 0.180 KG | 20.92% | 0.180 KG |
| | | 100.00% | 13.93% | 100.00% | 100.00% | | | 100.00% | |

70% Ethanol Formula - All weights below are per liter of final product needed.

1) Premix .180 KG of Polyamide Resin with .249 KG of Denatured Ethanol. Avomeen suggests premixing this formulation as it take time to blend.
2) Slowly add .022 KG of Fumed Aluminum Oxide to the blended formula above while mixing at medium speed - do not breathe the dust.
3) Add .00026 KG of 2,5-thiophenedylbis(5-tert-butyl-1,3-benzoxazole), .016 KG of PDMS and .0108 KG Alkylolammonium salt of an unsaturated acidic carboxylic acid ester to formula continuing to mix at medium speed.
4) Add .027 KG Alcohol Soluble Polyamide Resin and mix on high speed.
5) While continuing to mix at high speed, add remaining .353 KG Denatured Ethanol.
6) Add .0026 KG Hydrophobic copolymer polyelectrolyte and blend at high speed for 30 minutes.
7) Slight settling can occur over time. Product should be agitated before being added to roller machine for applicaton.

FIG. 4

Table 4: Compositional Summary of the final formulation

| ID | Function | Broad Range | | | | Narrow Range | | | | Preferred 80% Ethanol | | |
|---|---|---|---|---|---|---|---|---|---|---|---|---|
| | | Total Formula % (w/w) | Total Formula % (w/w) | KG per liter of final product | KG per liter of final product | Total Formula % (w/w) | Total Formula % (w/w) | KG per liter of final product | KG per liter of final product | Total Formula % (w/w) | KG per liter of final product | KG per liter of final product |
| Alcohol Soluble Polyamide Resin | Thermoset/Adhesion | 5.00% | 2.08% | 0.043 KG | 0.018 KG | 4.17% | 3.12% | 0.036 KG | 0.027 KG | 2.08% | | 0.018 KG |
| Fumed Aluminum Oxide | Anti-Static/Matting Agent | 4.00% | 1.67% | 0.0344 KG | 0.014 KG | 3.34% | 2.50% | 0.0287 KG | 0.022 KG | 1.67% | | 0.014 KG |
| PDMS | Lubricity Agent | 3.00% | 1.25% | 0.0258 KG | 0.011 KG | 2.50% | 1.87% | 0.0215 KG | 0.016 KG | 1.25% | | 0.011 KG |
| Alkylolammonium salt of an unsaturated acidic carboxylic acid ester | Conductivity | 2.00% | 0.83% | 0.0172 KG | 0.007 KG | 1.67% | 1.25% | 0.0144 KG | 0.0108 KG | 0.83% | | 0.007 KG |
| Hydrophobic copolymer polyelectrolyte | Dispersant | 0.50% | 0.22% | 0.0043 KG | 0.0019 KG | 0.42% | 0.31% | 0.0031 KG | 0.0026 KG | 0.22% | | 0.0019 KG |
| 2,5-thiophenediylbis(5-tert-butyl-1,3-benzoxazole) | UV Activator | 0.05% | 0.02% | 0.00043 KG | 0.0002 KG | 0.04% | 0.03% | 0.00034 KG | 0.00026 KG | 0.02% | | 0.0002 KG |
| 95% Ethanol; 5% Isopropyl Alcohol | Solvent | 51.90% | 80% | 0.446 KG | 0.687 KG | 60% | 70% | 0.516 KG | 0.602 KG | 80% | | 0.687 KG |
| Polyamide Resin | Binder | 33.55% | 13.93% | 0.2885 KG | 0.120 KG | 27.86% | 20.92% | 0.240 KG | 0.180 KG | 13.93% | | 0.120 KG |
| | | 100.00% | 100.00% | | | 100.00% | 100.00% | | | 100.00% | | |

80% Ethanol Formula - All weights below are per liter of final product needed.
1) Premix .120 KG of Polyamide Resin with .166 KG of Denatured Ethanol. Avomeen suggests premixing this formulation as it take time to blend.
2) Slowly add .014 KG of Fumed Aluminum Oxide to the blended formula above while mixing at medium speed - do not breathe the dust.
3) Add .0002 KG of 2,5-thiophenediylbis(5-tert-butyl-1,3-benzoxazole), .011 KG of PDMS and .007 KG Alkylolammonium salt of an unsaturated acidic carboxylic acid ester to formula continuing to mix at medium speed.
4) Add .018 KG Alcohol Soluble Polyamide Resin and mix on high speed.
5) While continuing to mix at high speed, add remaining .521 KG Denatured Ethanol.
6) Add .0019 KG Hydrophobic copolymer polyelectrolyte and blend at high speed for 30 minutes.
7) Slight settling can occur over time. Product should be agitated before being added to roller machine for applicaton.

DUST PREVENTION COMPOSITIONS, COATINGS AND PROCESSES OF MAKING

This application claims the benefit of priority to U.S. Provisional Patent Application Ser. No. 62/022,932 filed Jul. 10, 2014, which is incorporated by reference in its' entirety.

FIELD OF INVENTION

This invention relates compositions and processes for forming dust repellant surfaces, and in particular to compositions, applications, coatings, processes of making and applying compositions for preventing dust buildup on plastic and wood surfaces such as on ceiling fan blades, portable fan blades, stand fan blades, window blinds, appliances, furniture, cabinet knobs, and drawer pulls, by (1) dissipating static charges on the blades and (2) creating a very smooth blade surface that prevents dust particles getting "captured".

BACKGROUND AND PRIOR ART

Dust buildup is known to occur over time, especially on stationary products, and is undesirable. In addition to aesthetics, dust buildup can spread germs and produce health related issues over time. For example, various types of products such as fan blades on ceiling fans, portable fans and stand fans tend to build up dust over time when not in operation.

Current techniques to remove the dust buildup have centered on brushes, and the like. While the dust may be brushed off, the resulting falling dust ends up spreading the dirt and further contaminating other surfaces on which the dust falls. Other techniques, such as washing the surface can further be tedious and undesirable since the maintenance would some items, such as ceiling fans would require one to climb on a ladder, chair and the like, and can result in potential injury to the cleaner.

Various types of solutions have been proposed over the years. See for example, U.S. Published Patent Application 2011/0076478 to Haynes. However, these types of coatings have not been universally accepted and can cost extra undesirable costs that would make the underlying product costly as compared to untreated products.

Thus, the need exists for solutions to the above problems with the prior art.

SUMMARY OF THE INVENTION

A primary objective of the present invention is to provide compositions, applications, coatings, processes of making and applying compositions for preventing dust buildup on plastic and wood surfaces such as on ceiling fan blades, portable fan blades, stand fan blades, window blinds, appliances, furniture, cabinet knobs, and drawer pulls by dissipating static charges on the surfaces such as on the blade surfaces.

A secondary objective of the present invention is to provide compositions, applications, coatings, processes of making and applying compositions for preventing dust buildup on plastic and wood surfaces such as on ceiling fan blades, portable fan blades, stand fan blades, window blinds, appliances, furniture, cabinet knobs, and drawer pulls by creating a very smooth substrate surface, such as a blade substrate surface that prevents dust particles getting "captured".

A third objective of the present invention is to provide compositions, applications, coatings, processes of making and applying compositions for preventing dust buildup on plastic and wood surfaces such as on ceiling fan blades, portable fan blades, stand fan blades, window blinds, appliances, furniture, cabinet knobs, and drawer pulls without having to brush dust buildup off of the surfaces overtime.

A fourth objective of the present invention is to provide compositions, applications, coatings, processes of making and applying compositions for preventing dust buildup on plastic and wood surfaces such as on ceiling fan blades, portable fan blades, stand fan blades, window blinds, appliances, furniture, cabinet knobs, and drawer pulls without having to wash off and clean the surfaces overtime.

A preferred dust prevention composition, can include a coating for dissipating static charges on a surface and for providing a smoother finish to the surface that prevents dust particles getting "captured", and built up on the surface over time.

The coating can include a thermoset adhesion, an anti-static matting agent, a lubricity agent, conductivity component, a dispersant, a UV(ultra violet) activator, a solvent, and a binder, wherein the composition is useful as a coating on a surface to reduce dust buildup on the surface over time.

The coating can further include an acrylic resin as the thermoset adhesion, fumed alumina as the anti-static matting agent, PDMS(Polydimethylsiloxane) as the lubricity agent, alkylolammonium salt of an unsaturated acidic carboxylic acid ester as the conductivity component, hydrophobic copolymer polyelectrolyte as the dispersant, 2,5-thiophenediylbis(5-tert-butyl-1,3-benzoxazole) as the UV(ultra violet) activator, 95% Ethanol; 5% Isopropyl Alcohol as the solvent, and a polyamide resin as the binder.

The surface can be selected from at least one of ceiling fan blades, portable fan blades, stand fan blades, window blinds, appliances, furniture, cabinet knobs, and drawer pulls.

The coating can further include approximately 2.08% to approximately 5.00% acrylic resin as the thermoset adhesion, approximately 1.67% to approximately 4.00% fumed alumina as the anti-static matting agent, approximately 1.25% to approximately 3.00% PDMS(Polydimethylsiloxane) as the lubricity agent, approximately 0.83% to approximately 2.00% alkylolammonium salt of an unsaturated acidic carboxylic acid ester as the conductivity component, approximately 0.22% to approximately 0.50% hydrophobic copolymer polyelectrolyte as the dispersant, approximately 0.02% to approximately 0.05% 2,5-thiophenediylbis(5-tert-butyl-1,3-benzoxazole) as the UV(ultra violet) activator, approximately 80% to approximately 51.90% 95% Ethanol; 5% Isopropyl Alcohol as the solvent, and approximately 13.93% to approximately 33.55% polyamide resin as the binder.

The coating can further include approximately 3.12% to approximately 4.17% acrylic resin as the thermoset adhesion, approximately 2.50% to approximately 3.34% fumed alumina as the anti-static matting agent, approximately 1.87% to approximately 2.50% PDMS(Polydimethylsiloxane) as the lubricity agent, approximately 1.25% to approximately 1.67% alkylolammonium salt of an unsaturated acidic carboxylic acid ester as the conductivity component, approximately 0.31% to approximately 0.42% hydrophobic copolymer polyelectrolyte as the dispersant, approximately 0.03% to approximately 0.04% 2,5-thiophenediylbis(5-tert-butyl-1,3-benzoxazole) as the UV(ultra violet) activator, approximately 60% to approximately 70% 95% Ethanol; 5% Isopropyl Alcohol as the solvent, and approximately 13.93% to approximately 33.55% polyamide resin as the binder.

The coating can be approximately 51.9% Ethanol and can include approximately 5.00% acrylic resin as the thermoset adhesion, approximately 4.00% fumed alumina as the antistatic matting agent, approximately 3.00% PDMS(Polydimethylsiloxane) as the lubricity agent, approximately 2.00% alkylolammonium salt of an unsaturated acidic carboxylic acid ester as the conductivity component, approximately 0.50% hydrophobic copolymer polyelectrolyte as the dispersant, approximately 0.05% 2,5-thiophenediylbis (5-tert-butyl-1,3-benzoxazole) as the UV(ultra violet) activator, approximately 51.90% 95% Ethanol; 5% Isopropyl Alcohol as the solvent, and approximately 33.55% polyamide resin as the binder.

The coating can be approximately 60% Ethanol and can include approximately 4.17% acrylic resin as the thermoset adhesion, approximately 3.34% fumed alumina as the antistatic matting agent, approximately 2.50% PDMS(Polydimethylsiloxane) as the lubricity agent, approximately 1.67% alkylolammonium salt of an unsaturated acidic carboxylic acid ester as the conductivity component, approximately 0.42% hydrophobic copolymer polyelectrolyte as the dispersant, approximately 0.04% 2,5-thiophenediylbis(5-tert-butyl-1,3-benzoxazole) as the UV(ultra violet) activator, approximately 60% 95% Ethanol; 5% Isopropyl Alcohol as the solvent, and approximately 27.86% polyamide resin as the binder.

The coating can be approximately 70% Ethanol and can include approximately 3.12% acrylic resin as the thermoset adhesion, approximately 2.50% fumed alumina as the antistatic matting agent, approximately 1.87% PDMS(Polydimethylsiloxane) as the lubricity agent, approximately 1.25% alkylolammonium salt of an unsaturated acidic carboxylic acid ester as the conductivity component, approximately 0.31% hydrophobic copolymer polyelectrolyte as the dispersant, approximately 0.03% 2,5-thiophenediylbis(5-tert-butyl-1,3-benzoxazole) as the UV(ultra violet) activator, approximately 70% 95% Ethanol; 5% Isopropyl Alcohol as the solvent, and approximately 20.92% polyamide resin as the binder.

The coating can be approximately 80% Ethanol and can include approximately 2.08% acrylic resin as the thermoset adhesion, approximately 1.67% fumed alumina as the antistatic matting agent, approximately 1.25% PDMS(Polydimethylsiloxane) as the lubricity agent, approximately 0.83% alkylolammonium salt of an unsaturated acidic carboxylic acid ester as the conductivity component, approximately 0.22% hydrophobic copolymer polyelectrolyte as the dispersant, approximately 0.02% 2,5-thiophenediylbis(5-tert-butyl-1,3-benzoxazole) as the UV(ultra violet) activator, approximately 80% 95% Ethanol; 5% Isopropyl Alcohol as the solvent, and approximately 13.93% polyamide resin as the binder.

A method/process of preparing a dust prevention coating for surfaces, can include the steps of premixing Polyamide Resin with Denatured Ethanol into a blended formula, adding Fumed Aluminum Oxide to the blended formula while mixing at medium speed, adding 2,5-thiophenediylbis(5-tert-butyl-1,3-benzoxazole), PDMS(Polydimethylsiloxane) and alkylolammonium salt to the formula and continuing to mix at the medium speed, adding Alcohol Soluble Polyamide Resin to the formula and mix at high speed, adding Denatured Ethanol, and adding Hydrophobic copolymer polyelectrolyte and blend at high speed.

The medium speed can be approximately 100 rpm(revolutions per minute).

The high speed can be approximately 250 rpm(revolutions per minute).

The coating can be approximately 51.9% Ethanol.

The coating can be approximately 60% Ethanol.

The coating can be approximately 70% Ethanol.

The coating can be approximately 80% Ethanol.

A method of applying a dust prevention coating to a surface can include steps of:

providing a dust prevention coating having a composition with an anti-static component and a high lubricity additive to deter the accumulation of dust;

rolling the coating on the surface, allowing the coating on the surface to cure within approximately 4 minutes, and creating a very smooth surface with the rolled on coating that prevents dust particles getting "captured", and for dissipating static charges on the surface The surface can be selected from at least one of ceiling fan blades, portable fan blades, stand fan blades, window blinds, appliances, furniture, cabinet knobs, and drawer pulls.

Further objects and advantages of this invention will be apparent from the following detailed description of the presently preferred embodiments.

BRIEF DESCRIPTION OF THE FIGURES

FIG. 1 shows a Table 1 composition values for preventing dust buildup with minimum alcohol at 51.9% Ethanol, and process steps for making a coating.

FIG. 2 shows a Table 2 composition values for preventing dust buildup at 60% Ethanol, and process steps for making a coating.

FIG. 3 shows a Table 3 composition values for preventing dust buildup at 70% Ethanol, and process steps for making a coating.

FIG. 4 shows a Table 4 composition values for preventing dust buildup at Maximum Alcohol 80% Ethanol, and process steps for making a coating.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

The invention covers a roller applied coating which can be applied to a paper overlay plastic and surfaces such as surfaces such as on ceiling fan blades, portable fan blades, stand fan blades, window blinds, appliances, furniture, cabinet knobs, and drawer pulls.

The coating can have a clear matte finish and contains an anti-static and high lubricity additive to deter the accumulation of dust. After applying the coating the dry time of the coatings by thin coat gravure rollers is approximately four minutes. When applied the coating can result in up to approximately 50% less dust buildup over a one week period of time. The cost for the coating material is less than approximately $40 per gallon. The term approximately can include +/− -ten percent of the listed values.

FIG. 1 shows a Table 1 composition values for preventing dust buildup with minimum alcohol at 51.9% Ethanol, and process steps for making a coating. FIG. 2 shows a Table 2 composition values for preventing dust buildup at 60% Ethanol, and process steps for making a coating. FIG. 3 shows a Table 3 composition values for preventing dust buildup at 70% Ethanol, and process steps for making a coating. FIG. 4 shows a Table 4 composition values for preventing dust buildup at Maximum Alcohol 80% Ethanol, and process steps for making a coating.

The coating can include the combination of acrylic resin as a thermoset adhesion, fumed alumina as an anti-static matting agent, PDMS as a lubricity agent, alkylolammonium salt of an unsaturated acidic carboxylic acid ester for conductivity, hydrophobic copolymer polyelectrolyte as a dispersant, 2,5-thiophenediylbis(5-tert-butyl-1,3-benzoxazole) as a UV(ultra violet) activator, 95% Ethanol; 5% Isopropyl Alcohol as a solvent, and polyamide resin as a binder, with the percentages listed in the Tables shown in FIGS. 1-4.

Polydimethylsiloxane(PDMS) belongs to a group of polymeric organosilicon compounds that are commonly referred to as silicones.

A list of novel process steps for preparing the dust prevention coating can include the following steps shown in FIG. 1:

All weights below are per liter of final product needed.

1) Premix 0.2885 KG of ALCOHOL SOLUBLE POLYAMIDE RESIN with 0.3995 KG of Denatured Ethanol.

Premixing this formulation is to take time to blend the components.

Premixing should be performed within 24 hours of intended application.

2) Slowly add 0.0344 KG of FUMED ALUMINUM OXIDE to the blended formula above while mixing at medium speed—do not breathe the dust.

3) Add 0.00043 KG of 2,5-thiophenediylbis(5-tert-butyl-1,3-benzoxazole), 0.0258 JG of Dimethicone and 0.0172 KG (Alkylolammonium salt of an unsaturated acidic carboxylic acid ester) to formula continuing to mix at medium speed.

4) Add 0.043 KG POLYURETHANE CLEAR COATING and mix on high speed.

5) While continuing to mix at high speed, add remaining 0.0465 KG Denatured Ethanol.

6) Add 0.0043 KG HYDROPHOBIC COPOLYMER Polyelectrolyte and blend at high speed for approximately 30 minutes.

7) Slight settling can occur over time. Product should be agitated before being added to roller machine for application.

The process steps for the compositions depicted in FIGS. 2-4 are similar, but with different amounts of each of the component values.

Medium speed can be approximately 100 rpm(revolutions per minute) and high speed can include approximately 250 rpm. Any speed higher than 250 rpm can degrade the polyamide polymer and should be avoided.

Referring to the Tables in FIGS. 1-4, each of the minimum and maximum amounts of Ethanol (51.9%, 60%, 70% and 80%), can have a similar broad range of the Total Formula %(w/w) of each of the components in the composition. Similarly, each of the minimum and maximum amounts of Ethanol (51.9%, 60%, 70% and 80%), can have a similar narrow range of the Total Formula %(w/w) of each of the components in the composition.

The preferred value of Total Formula %(w/w) of Ethanol (51.9%, 60%, 70% and 80%) can have different preferred values. Each of the values in the Tables can include the listed value, and the listed value with a prefix of "approximately" where "approximately" includes +/− 10%.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. The dust prevention composition, wherein the composition comprises:
a thermoset adhesion;
an anti-static matting agent;
a lubricity agent;
conductivity component;
a dispersant;
a UV(ultra violet) activator;
a solvent; and
a binder, wherein the composition is useful as a coating on a surface to reduce dust buildup on the surface over time.

2. The dust prevention composition of claim 1, wherein the composition further includes:
acrylic resin as the thermoset adhesion;
fumed alumina as the anti-static matting agent;
PDMS(Polydimethylsiloxane) as the lubricity agent;
alkylolammonium salt of an unsaturated acidic carboxylic acid ester as the conductivity component;
hydrophobic copolymer polyelectrolyte as the dispersant,
2,5-thiophenediylbis(5-tert-butyl-1,3-benzoxazole) as the UV(ultra violet) activator;
Ethanol and Isopropyl Alcohol as the solvent; and
polyamide resin as the binder.

3. The dust prevention composition of claim 2, wherein the composition further includes:
approximately 2.08% to approximately 5.00% acrylic resin as the thermoset adhesion;
approximately 1.67% to approximately 4.00% fumed alumina as the anti-static matting agent;
approximately 1.25% to approximately 3.00% PDMS (Polydimethylsiloxane) as the lubricity agent;
approximately 0.83% to approximately 2.00% alkylolammonium salt of an unsaturated acidic carboxylic acid ester as the conductivity component;

approximately 0.22% to approximately 0.50% hydrophobic copolymer polyelectrolyte as the dispersant;
approximately 0.02% to approximately 0.05% 2,5-thiophenediylbis(5-tert-butyl-1,3-benzoxazole) as the UV(ultra violet) activator;
approximately 80% to approximately 51.90% Ethanol and Isopropyl Alcohol as the solvent; and
approximately 13.93% to approximately 33.55% polyamide resin as the binder.

4. The dust prevention composition of claim 3, wherein the composition further includes:
approximately 3.12% to approximately 4.17% acrylic resin as the thermoset adhesion;
approximately 2.50% to approximately 3.34% fumed alumina as the anti-static matting agent;
approximately 1.87% to approximately 2.50% PDMS (Polydimethylsiloxane) as the lubricity agent;
approximately 1.25% to approximately 1.67% alkylolammonium salt of an unsaturated acidic carboxylic acid ester as the conductivity component;
approximately 0.31% to approximately 0.42% hydrophobic copolymer polyelectrolyte as the dispersant;
approximately 0.03% to approximately 0.04% 2,5-thiophenediylbis (5-tert-butyl-1,3-benzoxazole) as the UV(ultra violet) activator;
approximately 60% to approximately 70% Ethanol; and Isopropyl Alcohol as the solvent; and
approximately 13.93% to approximately 33.55% polyamide resin as the binder.

5. The dust prevention composition of claim 4, wherein the composition includes approximately 51.9% Ethanol and includes:
approximately 5.00% acrylic resin as the thermoset adhesion;
approximately 4.00% fumed alumina as the anti-static matting agent;
approximately 3.00% PDMS(Polydimethylsiloxane) as the lubricity agent;
approximately 2.00% alkylolammonium salt of an unsaturated acidic carboxylic acid ester as the conductivity component;
approximately 0.50% hydrophobic copolymer polyelectrolyte as the dispersant;
approximately 0.05% 2,5-thiophenediylbis(5-tert-butyl-1,3-benzoxazole) as the UV(ultra violet) activator;
approximately 51.90% Ethanol; and Isopropyl Alcohol as the solvent; and
approximately 33.55% polyamide resin as the binder.

6. The dust prevention composition of claim 4, wherein the composition includes approximately 60% Ethanol and includes:
approximately 4.17% acrylic resin as the thermoset adhesion;
approximately 3.34% fumed alumina as the anti-static matting agent;
approximately 2.50% PDMS(Polydimethylsiloxane) as the lubricity agent;
approximately 1.67% alkylolammonium salt of an unsaturated acidic carboxylic acid ester as the conductivity component;
approximately 0.42% hydrophobic copolymer polyelectrolyte as the dispersant;
approximately 0.04% 2,5-thiophenediylbis(5-tert-butyl-1,3-benzoxazole) as the UV(ultra violet) activator;
approximately 60% Ethanol; and approximately 5% Isopropyl Alcohol as the solvent; and
approximately 27.86% polyamide resin as the binder.

7. The dust prevention composition of claim 4, wherein the composition includes approximately 70% Ethanol and includes:
approximately 3.12% acrylic resin as the thermoset adhesion;
approximately 2.50% fumed alumina as the anti-static matting agent;
approximately 1.87% PDMS(Polydimethylsiloxane) as the lubricity agent;
approximately 1.25% alkylolammonium salt of an unsaturated acidic carboxylic acid ester as the conductivity component;
approximately 0.31% hydrophobic copolymer polyelectrolyte as the dispersant;
approximately 0.03% 2,5-thiophenediylbis(5-tert-butyl-1,3-benzoxazole) as the UV(ultra violet) activator;
approximately 70% Ethanol and Isopropyl Alcohol as the solvent; and
approximately 20.92% polyamide resin as the binder.

8. The dust prevention composition of claim 4, wherein the composition includes approximately 80% Ethanol and includes:
approximately 2.08% acrylic resin as the thermoset adhesion;
approximately 1.67% fumed alumina as the anti-static matting agent;
approximately 1.25% PDMS(Polydimethylsiloxane) as the lubricity agent;
approximately 0.83% alkylolammonium salt of an unsaturated acidic carboxylic acid ester as the conductivity component;
approximately 0.22% hydrophobic copolymer polyelectrolyte as the dispersant;
approximately 0.02% 2,5-thiophenediylbis(5-tert-butyl-1,3-benzoxazole) as the UV(ultra violet) activator;
approximately 80% Ethanol; and Isopropyl Alcohol as the solvent; and
approximately 13.93% polyamide resin as the binder.

9. A dust prevention coating, comprising:
acrylic resin;
fumed alumina;
PDMS(Polydimethylsiloxane);
alkylolammonium salt of an unsaturated acidic carboxylic acid ester;
hydrophobic copolymer polyelectrolyte,
2,5-thiophenediylbis(5-tert-butyl-1,3-benzoxazole);
Ethanol and Isopropyl Alcohol; and
polyamide resin, wherein the coating is useful for preventing dust buildup on a surface.

* * * * *